United States Patent

Polk

[11] 4,008,027
[45] Feb. 15, 1977

[54] APPARATUS FOR FORMING A PIPING BEAD

[76] Inventor: James K. Polk, R.D. 2, Box 307A1, Englishtown, N.J. 07726

[22] Filed: June 21, 1974

[21] Appl. No.: 481,840

[52] U.S. Cl. .............................. 425/127; 156/380; 156/580; 425/129 R; 425/174.2; 425/174.4; 425/217; 425/242 R; 425/243; 425/DIG. 44

[51] Int. Cl.² .................... B29C 1/00; B29F 1/022

[58] Field of Search .......... 264/242, 259, 313, 328, 264/254, 252, 337, 25, 23, 248, DIG. 60; 425/129, 217, 242, 243, DIG. 44, 129 R, 174.2, 174.4, 242 R, 127; 156/73.1, 245, 380, 580

[56] References Cited

UNITED STATES PATENTS

| 3,082,587 | 3/1963 | Brimberg | 264/259 |
| 3,166,795 | 1/1965 | Joffe | 264/328 |
| 3,408,438 | 10/1968 | Staunton | 264/252 |
| 3,475,530 | 10/1969 | Cooper | 264/259 |
| 3,694,529 | 9/1972 | Josephsen et al. | 264/328 |
| 3,773,873 | 11/1973 | Spaak et al. | 264/328 |

OTHER PUBLICATIONS

Whittington, Whittington's Dictionary of Plastics, Society of Plastics Engineers, Technomic, Conn. (1968) p. 212.
Winspear, Vanderbilt Rubber Handbook, Vanderbilt, N.Y. (1968) p. 174.
Anon., "Greater Versatility . . . with Silastic RTV", Dow Corning 1961, pp. 1 & 2.

Primary Examiner—Willard E. Hoag
Attorney, Agent, or Firm—Lewis H. Eslinger

[57] ABSTRACT

A device for applying a piping bead to a sheet of plastic material includes a two piece sealing die comprising a mold section and a platen. The mold section has an open cavity of predetermined configuration formed therein surrounding a flat sheet support surface on which a plastic sheet is supported to extend over the cavity. The mold section includes means for supplying a liquified plastic to the cavity to contact the support plastic sheet, and the mandrel is adapted to engage the side of the sheet opposite the cavity to chill and solidify the liquid plastic and to bond it to the plastic sheet.

5 Claims, 7 Drawing Figures

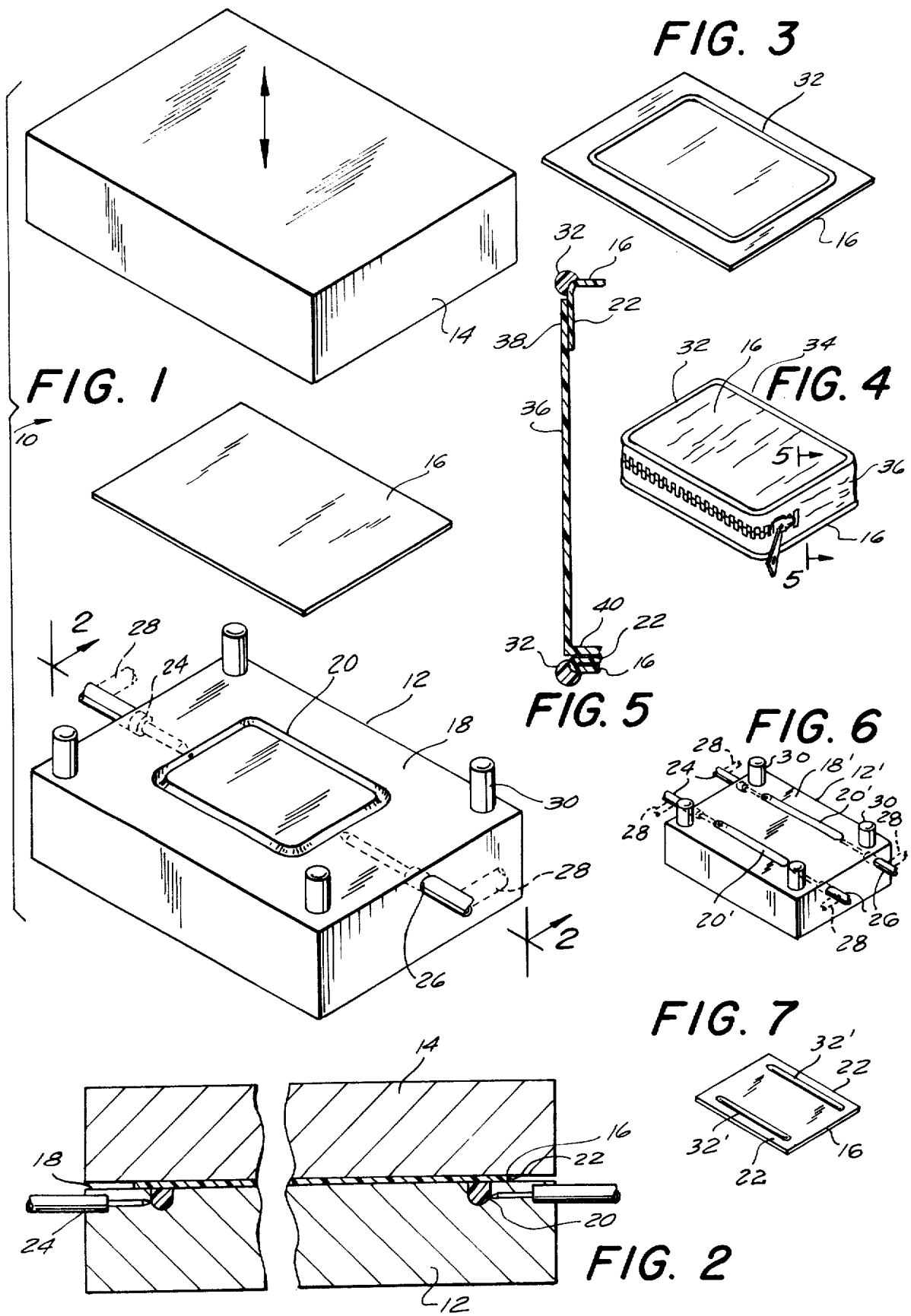

APPARATUS FORMING A PIPING BEAD

The present invention relates to a method and apparatus for securing a piping bead or edge on a sheet of plastic material.

The use of articles formed of plastic materials has become widespread in recent years and typically involves the provision of an edge piping for a decorative or reinforcing effect. Such piping is normally formed initially as a separate cylindrical rod element which is held in special jigs and mounting arrangements in order to be heat sealed or welded to a sheet of plastic material. These previously proposed methods of providing the plastic sheets for packaging articles, such as pocketbooks, purses, luggage, premium containers and the like, with decorative or reinforcing piping edges, have been relatively expensive, and require a large number of laborers to perform the difficult mounting or supporting operations for the piping bead.

Accordingly, it is an object of the present invention to provide a method and apparatus for automatically forming a piping bead on a sheet of plastic material.

Another object of the present invention is to form a piping bead on a sheet of plastic material by an apparatus which is relatively inexpensive in construction and simple in operation.

In accordance with one aspect of the present invention, a device for applying a piping to sheet of plastic material is disclosed which consists of a two piece sealing die including a lower mold section and a cooperative vertically moving upper platen. The mold section has an open cavity formed about a flat sheet support surface and is adapted to receive a supply of liquefied plastic material therein. The flat support surface of the mold section is adapted to support a sheet of plastic material over the cavity in contact with liquefied plastic in the cavity. The platen is moved into contact with the sheet of plastic material, on the side thereof opposite the mold section cavity and is operated to provide high energy to the plastic sheet in order to form a bond between the sheet and the liquefied plastic, and further to cool the liquefied plastic in order to solidify the same in order to form a solid piping rod on the plastic sheet. The cavity in the mold is located so that the piping bead is formed inwardly of the edges of the plastic sheet, whereby those edges are free and remain available for sealing the sheet to other sheets of material in the completed article.

The above, and other objects, features and advantages of the present invention, will be apparent to those skilled in the art in the following detailed description of an illustrative embodiment thereof which is to be read in connection with the accompanying drawings wherein:

FIG. 1 is an exploded perspective view of a sealing device constructed in accordance with the present invention;

FIG. 2 is a sectional view taken along line 2—2 of FIG. 1;

FIG. 3 is a reduced perspective view of a plastic sheet having a piping bead formed thereon in accordance with the method of the present invention;

FIG. 4 is a perspective view of an article formed by the use of plastic sheets having piping edges formed thereon in accordance with the present invention;

FIG. 5 is a sectional view taken along line 5—5 of FIG. 4;

FIG. 6 is a partial perspective view, similar to FIG. 1, but on a reduced scale, of another embodiment of the mold section of the device of the present invention; and FIG. 7 is a perspective view, similar to FIG. 3, of a plastic sheet having a piping bead formed thereon by use of the mold section of FIG. 7.

Referring now to the drawing in detail, and initially to FIG. 1 thereof, it will be seen that a sealing device 10, constructed in accordance with the present invention, comprises a two piece arrangement including a lower mold section 12 and an upper platen 14. The upper platen is of conventional construction and is adapted to be vertically moved in any convenient manner with respect to the lower mold section 12, for the purposes described more fully hereinafter. Lower mold section 12, which may be formed of an elastomeric material such as RTV silicon or the like, is adapted to support a sheet of plastic material 16, such as vinyl or the like, on its flat upper surface 18, so that a bead of plastic material can be formed and secured to the sheet 16 in order to provide a piping edge thereon.

Lower mold section 12 has an open cavity 20 of predetermined configuration formed therein. In the illustrated embodiment of the invention this cavity has a generally rectangular configuration, and provides a mold shape for the piping bead to be secured to sheet 16. Cavity 20 is located such that it is within the confines of the edges of sheet 16 (see FIG. 2), i.e., so that the edges 22 of sheet 16 extend beyond cavity 20. In this manner the piping formed on the sheet, as described hereinafter, is located inwardly of the edges 22 of the sheet 16 so that these edges are available to be secured to other sheets of material in order to form a complete article, for example the purse of FIG. 4.

Cavity 20 is adapted to receive liquified plastic, for example plastisol, from a source thereof (not shown) through an inlet port 24 formed in mold section 12. The plastisol, which should be compatible with the plastic of sheet 16, can be supplied to the inlet port 24 under pressure in any convenient manner. Thus, it will be seen that upon the supply of plastic through inlet port 24 to cavity 20, the entire cavity will be filled with this material. However, the mold section 12 is also provided with an outlet port arrangement 26 for the liquified plastic. This outlet is in communication, through a conduit 28 or the like, (shown in dotted lines in FIG. 1) with the inlet port 24, so as to provide an overflow escape for the plastisol in cavity 20. That is, the conduit 28 provides for recirculation of the plastisol from the cavity back to the inlet and does not remain in the cavity.

Typically, sheet 16 will be placed on the support surface 18 of mold section 12 before the introduction of the plastisol into cavity 20. Similiarly the platen 14 will be lowered (for example by a hydraulic ram of the like) into contact with the plastic sheet 16, on the side thereof opposite the cavity 20, so that sheet 16 is clamped tightly against the mold section 12 and the open top of the cavity 20 is closed. In this connection it is noted that the mold section 12 can be provided with a plurality of guide members 30 which are received in corresponding recesses (not seen in the drawing) in platen 14, in order to properly guide the platen in its vertical motion and to keep the two elements properly aligned.

After the platen is placed in the position shown in FIG. 2. the plastisol is injected through the inlet opening 24 into the channel 20. When the channel is properly filled with the liquid plastisol, high energy frequency signals (such as radio or ultrasonic signals) are applied to the platen to the sheet the limitation "high frequency means" as used hereinafter refers to means producing radio frequency or ultrasonic signals adequate to bond plastic piping to said sheet 16 in order to bond the plastisol to the sheet.

It is noted that in lieu of supplying the liquid plastisol to the cavity 20 it is contemplated that a preformed rod of plastic or the like, having a generally cylindrical configuration can be manually placed in the cavity 20 for support thereby. In this embodiment, the vinyl sheet is placed over the cavity 20 after the vinyl rod is placed therein, and then platen 14 is lowered. At that point the platen provides a high frequency signals or energy required to bond the sheet 16 to the piping cavity 20.

In any case, after the bonding operation is completed the sheet 16 has the appearance illustrated in FIG. 3, with a generally rectangular bead of material 32 formed thereon. This material is, of course, the solidified plastisol which had previously been placed in the cavity 20 of mold section 12. This sheet can now be used to form a complete article, such as for example the purse 34 shown in FIG. 4.

In order to form the purse 34, it is contemplated, for example, that two sheets 16 having beads 32 formed thereon would be used in conjunction with an unbeaded elongated strip of material 36, that forms the side wall of the purse. For example, as shown in FIG. 5, the sheets 16 forming the top and bottom surfaces of the purse, would be secured to the sheet 36 by their edges 22, adjacent the beads 32. FIG. 5 shows two methods of securing the edges 22 of sheet 16 to the side strip 36. In the upper portion of FIG. 5 the free edge 22 of sheet 16 is simply turned at 90° and sealed to the edge 38 of sheet 36 in any convenient manner, (as for example by heat sealing) with the free edge 38 abutting the bead 32. On the other hand, in the lower portion of the FIG. 5, a different method of securing the sheets is illustrated wherein it is seen that the free edge 22 of lower sheet 16 is bent through 180° to engage the bent or folded end 40 of sheet 36. The heat seal can then be formed at the fold 40 and edge 22. It is believed that either of these methods of securing the side strip or panel 36 to the sheets 16 will produce satisfactory results from both a structure and appearance viewpoint.

In the embodiment of the invention shown in FIGS. 1–5 of the drawing the cavity 20 in mold section 12 is formed to define a generally rectangular bead (in plan) adjacent the periphery of the rectangular plastic sheet 16. However, it is contemplated that the device of the present invention can be formed to provide beads of various configurations. For example, as shown in FIG. 6 a mold section 12', for use in lieu of the mold section 12 of the embodiment of FIG. 1, can be provided to form two separate and parallel beads 32' on the plastic sheet 16 (FIG. 7). In this embodiment of the invention the surface 18' of mold section 12' is provided with two parallel mold cavities 20', each of which is provided with an inlet opening or port 24 through which plastisol can be supplied. In addition each cavity can be provided with an independent outlet port 26 through which plastisol can be recirculated from the mold cavity to the inlet port 24.

The mold section 12' of FIG. 6 is used in the same manner as the mold section 12 of FIG. 1, with the sheet 16 being placed on the support surface 18' before the introduction of plastisol into cavities 20. Thereafter the platen 14 (not shown in FIG. 6) is lowered to clamp the sheet 16 in place, plastisol in injected into the cavities 20 and the sealing process is performed. As a result sheet 16 (shown inverted in FIG. 7) is provided with spaced parallel beads 32' thereon. The sheet can then be used in any desired package construction or the like where a piping edge is required, with the outer edges 22 of the sheet, adjacent the beads, being used to seal the sheet to an adjacent sheet, in the manner described above with respect to FIG. 5.

Of course, it will be understood that in lieu of the rectangular or spaced parallel cavities 20, 20' of the mold sections 12, 12' shown in FIGS. 1 and 6, other cavity configurations can also be utilized, depending on the configuration of or requirements for the particular article being formed.

Accordingly, it will be appreciated that a relatively simple and inexpensive method and apparatus for producing a piping bead for reinforcing and or decorative purposes on a sheet of plastic material is provided by the above described invention. The method is relatively simple to carry out, even by unskilled laborers, without the need for manual arranging or placing the piping strip in special jigs or the like, with respect to the sheet to which it is to be secured, as was required in previously proposed systems. As a result, the provision of piping on plastic sheets can now be performed in relatively high speed mass production operations.

Although an illustrative embodiment of the present invention has been described herein with reference to the accompanying drawings, it is to be understood that the invention, is not limited to that precise embodiment, but that various changes and modifications may be effected therein by one skilled in the art without departing from the scope or spirit of the invention.

What is claimed:

1. A device for applying a piping bead to a sheet of plastic material comprising a two piece sealing die having a mold section and a platen, said mold section having a flat sheet support surface throughout substantially its entire extent for supporting a plastic sheet thereon in a flat configuration, said flat surface cavity of generally semi-cylindrical cross-section formed therein and located in a predetermined position such that said plastic sheet is supported on said support surface over said cavity said mold section being made of RTV silicone, and means for supplying a liquefied plastic to said cavity to contact said supported sheet, said means for supplying liquefied plastic to said mold section includes an input port communicating through said mold section with said cavity a separate output port for said liquefied plastic also communicating through said mold section with said cavity, and means for providing communication between said separate outlet and inlet ports to provide for flow back of excess liquefied plastic from said separate outlet port to said inlet port; and said platen being adapted to engage the side of said sheet opposite said cavity, said platen including high frequency means for heating said plastic and said sheet in said die and cooling means in said platen.

2. The device as defined in claim 1 wherein said mold is formed of RTV silicone.

3. The device as defined in claim 1 wherein said cavity comprises an open channel formed in said mold section defining a rectangle in plan.

4. The device as defined in claim 1 wherein said mold section has a pair of shaped cavities formed therein for forming a pair of spaced piping beads.

5. The device as defined in claim 4 wherein said liquefied plastic is plastisol.

* * * * *